(12) United States Patent
Johnsen et al.

(10) Patent No.: US 11,193,364 B1
(45) Date of Patent: Dec. 7, 2021

(54) PERFORMANCE INDEX USING FREQUENCY OR FREQUENCY-TIME DOMAIN

(71) Applicant: Schlumberger Technology Corporation, Sugar Land, TX (US)

(72) Inventors: Joergen K. Johnsen, Houston, TX (US); Mbaga Louis Ahorukomeye, Houston, TX (US); Rui Pan, Houston, TX (US); Yuzhen Xue, Houston, TX (US); Mahmoud Hadi, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/891,640

(22) Filed: Jun. 3, 2020

(51) Int. Cl.
| | | |
|---|---|---|
| *E21B 44/04* | (2006.01) | |
| *E21B 44/06* | (2006.01) | |
| *G01H 1/00* | (2006.01) | |
| *G06F 17/14* | (2006.01) | |
| *E21B 3/02* | (2006.01) | |

(52) U.S. Cl.
CPC .............. *E21B 44/04* (2013.01); *E21B 44/06* (2013.01); *G01H 1/003* (2013.01); *G06F 17/142* (2013.01); *E21B 3/022* (2020.05)

(58) Field of Classification Search
CPC ...... E21B 41/0092; E21B 44/00; E21B 44/04; E21B 44/06; E21B 2200/22
See application file for complete search history.

(56) References Cited

U.S. PATENT DOCUMENTS

| | | | | |
|---|---|---|---|---|
| 4,633,449 | A * | 12/1986 | Ingram | G01V 1/44 367/75 |
| 6,363,780 | B1 * | 4/2002 | Rey-Fabret | E21B 44/00 73/152.45 |
| 8,214,188 | B2 * | 7/2012 | Bailey | E21B 7/00 703/10 |
| 10,053,971 | B2 | 8/2018 | Lai et al. | |
| 10,520,619 | B2 * | 12/2019 | Yang | G01V 1/362 |
| 2014/0326449 | A1 * | 11/2014 | Samuel | E21B 41/0092 166/250.01 |
| 2016/0076354 | A1 | 3/2016 | Lai et al. | |
| 2016/0115778 | A1 * | 4/2016 | van Oort | E21B 12/02 175/27 |
| 2016/0123080 | A1 * | 5/2016 | Herbig | E21B 3/00 700/275 |
| 2016/0348493 | A1 * | 12/2016 | Hohl | F04C 13/008 |
| 2017/0067337 | A1 * | 3/2017 | Havens | E21B 47/16 |

(Continued)

FOREIGN PATENT DOCUMENTS

CN 104453857 A * 3/2015

*Primary Examiner* — Frederick L Lagman
(74) *Attorney, Agent, or Firm* — Jeffrey D. Frantz

(57) ABSTRACT

First time-based data, indicative of a first parameter, varies in value with respect to time and is associated with a drilling operation utilized to construct a well extending into a subterranean formation. A moving window transform of second time-based data is performed to generate a three-dimensional expression of frequency and amplitude of the first parameter or a second parameter. The second time-based data is based on the first time-based data. The second parameter varies in value with respect to time and is dependent upon the first parameter. The drilling operation is assessed based on the expression.

20 Claims, 7 Drawing Sheets

(56) References Cited

U.S. PATENT DOCUMENTS

| | | | |
|---|---|---|---|
| 2017/0108602 A1* | 4/2017 | Yang | G01V 1/325 |
| 2017/0212262 A1* | 7/2017 | Yao | G01N 29/46 |
| 2018/0274352 A1* | 9/2018 | Orban | H02P 6/08 |
| 2018/0340410 A1* | 11/2018 | Rivera-Rios | E21B 44/00 |
| 2019/0024493 A1* | 1/2019 | Johnson | G06N 20/10 |
| 2019/0106979 A1* | 4/2019 | Hadi | E21B 44/02 |
| 2019/0187012 A1 | 6/2019 | Wu et al. | |
| 2020/0245044 A1* | 7/2020 | Menssen | G01V 5/12 |

\* cited by examiner

PERFORMANCE INDEX USING FREQUENCY OR FREQUENCY-TIME DOMAIN

BACKGROUND OF THE DISCLOSURE

Oscillations during drilling of an oil/gas well can be detrimental to drilling equipment, efficiency, and safety. Such oscillations can also be indicative of the performance of various controllers of the drilling system. Prior attempts to characterize such oscillations, however, have provided information pertaining to the degree of oscillation amplitude, and have not sufficiently characterized the corresponding frequency-related information.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes obtaining first time-based data indicative of a first parameter. The first parameter varies in value with respect to time and is associated with a drilling operation utilized to construct a well extending into a subterranean formation. The method also includes performing a moving window transform of second time-based data to generate a three-dimensional expression of frequency and amplitude of the first parameter or a second parameter. The second time-based data is based on the first time-based data. The second parameter varies in value with respect to time and is dependent upon the first parameter. The method also includes assessing the drilling operation based on the expression.

The present disclosure also introduces a method that includes commencing operation of a controller of a well construction system. The well construction system is located at a wellsite and includes multiple pieces of equipment operable to perform well construction operations. Commencing operation of the controller causes the controller to receive sensor data facilitated by sensors each disposed in association with a corresponding piece of equipment. Commencing operation of the controller also causes the controller to obtain first time-based data indicative of a first parameter. The first parameter varies in value with respect to time and is associated with a drilling operation utilized to construct a well extending into a subterranean formation. Commencing operation of the controller also causes the controller to perform a moving window transform of second time-based data to generate a three-dimensional expression of frequency and amplitude of the first parameter or a second parameter. The second time-based data is based on the first time-based data. The second parameter varies in value with respect to time and is dependent upon the first parameter. Commencing operation of the controller also causes the controller to assess the drilling operation based on the expression.

The present disclosure also introduces a controller of a well construction system. The well construction system is located at a wellsite and includes multiple pieces of equipment operable to perform well construction operations. The controller is operable to receive sensor data facilitated by sensors each disposed in association with a corresponding piece of equipment. The controller is also operable to obtain first time-based data indicative of a first parameter. The first parameter varies in value with respect to time and is associated with a drilling operation utilized to construct a well extending into a subterranean formation. The controller is also operable to perform a moving window transform of second time-based data to generate a three-dimensional expression of frequency and amplitude of the first parameter or a second parameter. The second time-based data is based on the first time-based data. The second parameter varies in value with respect to time and is dependent upon the first parameter. The controller is also operable to assess the drilling operation based on the expression.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
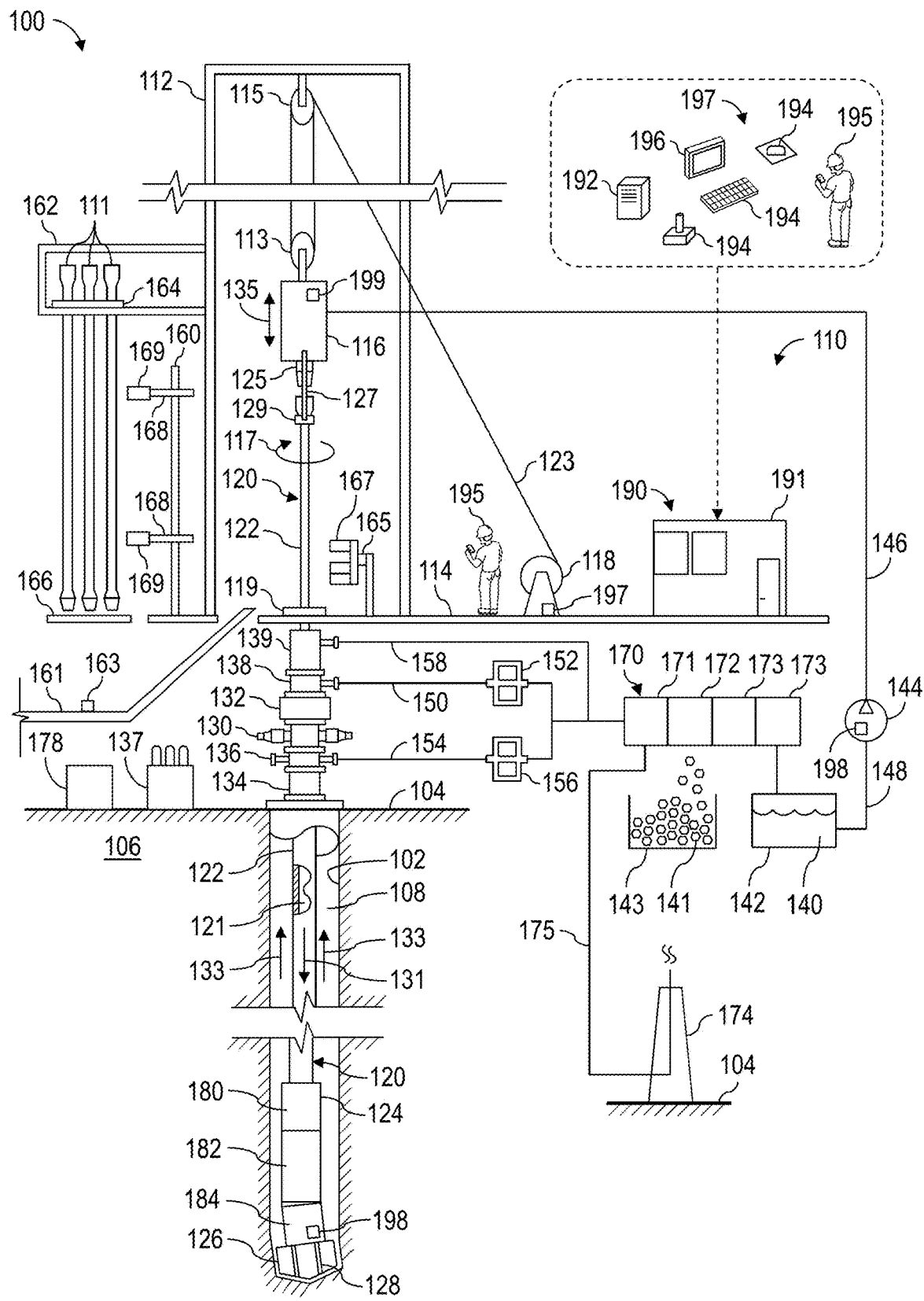
FIG. 1 is a schematic view of at least a portion of an example implementation of a well construction system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction (e.g., drilling) rig. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 comprises various well construction equipment (i.e., wellsite equipment), including surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118 (and perhaps an anchor). The drawworks 118 may thus selectively impart tension to the support line 123 to lift and lower the top drive 116, resulting in the vertical motion 135. The drawworks 118 may comprise a drum, a base, and a prime mover (e.g., an electric motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor) (not shown), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control comprising a series of pressure barriers (e.g., rams) between the wellbore 102 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals) of the fluid control devices 130, 132, 138. The power unit 137 may comprise one or more hydraulic pumps actuated by electric motors and operable to pressurize hydraulic fluid for operating the fluid control devices 130, 132, 138 as described herein.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more mud pump units 144 (i.e., drilling fluid pumps) operable to move the drilling fluid 140 from the container 142 into the fluid passage 121 of the drill string 120 via a fluid conduit 146 extending from the pump units 144 to the top drive 116 and an internal passage extending through the top drive 116. Each pump unit 144 may comprise a fluid pump (not shown) operable to pump the drilling fluid 140 and a prime mover (e.g., an electric motor) (not shown) operable to drive the corresponding fluid pump. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annulus 108 via different fluid control devices during different stages or scenarios of well drilling operations. For example, the drilling fluid may exit the annulus 108 via a bell nipple 139, the RCD 138, or a ported adapter 136 (e.g., a spool, cross adapter, a wing valve, etc.) located below one or more rams of the BOP stack 130.

During normal drilling operations, the drilling fluid may exit the annulus 108 via the bell nipple 139 and then be directed toward drilling fluid reconditioning equipment 170 via a fluid conduit 158 (e.g., gravity return line) to be cleaned and/or reconditioned, as described below, before being returned to the container 142 for recirculation. During managed pressure drilling operations, the drilling fluid may exit the annulus 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annulus 108 by variably restricting flow of the drilling fluid or other fluids flowing through the choke manifold 152. The greater the restriction to flow through the choke manifold 152, the greater the backpressure applied to the annulus 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annulus 108 via the ported adapter 136 and be directed into a choke manifold 156 (e.g., a rig choke manifold, well control choke manifold) via a fluid conduit 154 (e.g., rig choke line). The choke manifold 156 may include at least one choke and a plurality of fluid valves (neither shown) collectively operable to control the flow of the drilling fluid through the choke manifold 156. Backpressure may be applied to the annulus 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid gas (i.e., mud gas) separators 171, shale shakers 172, and other drilling fluid cleaning and reconditioning equipment 173. The liquid gas separators 171 may remove formation gasses entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify chemical and/or physical properties or characteristics (e.g., rheology, density) of the drilling fluid. For example, the drilling fluid reconditioning equipment 170 may include a degasser, a desander, a desilter, a centrifuge, a mud cleaner, and/or a decanter, among other examples. The drilling fluid reconditioning equipment 170 may further include chemical containers and mixing equipment collectively operable to mix or otherwise add selected chemicals to the drilling fluid returning from the wellbore 102 to modify chemical and/or physical properties or characteristics of the drilling fluid being pumped back into the wellbore 102. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161. The tubular handling system may comprise a plurality of actuators collectively operable to move various portions of the tubular handling equipment to perform the methods and operations described herein. The actuators may be or comprise electric motors and/or hydraulic cylinders and rotary actuators. The hydraulic cylinders and rotary actuators may be powered by hydraulic power packs comprising hydraulic pumps actuated by electric motors to pressurize hydraulic fluid.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections. The iron roughneck may comprise a plurality of actuators collectively operable to move various portions of the iron roughneck to perform the methods and operations described herein. The actuators may be or comprise electric motors.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (e.g., the uppermost tubular) of the drill string 120 to thereby suspend and prevent advancement of the drill string 120 within the wellbore 102, such as during the make up and break out operations.

During drilling operations, the various well construction equipment of the well construction system 100 may progress through a plurality of coordinated operations (i.e., operational sequences) to drill or otherwise construct the wellbore 102. The operational sequences may change based on a well construction plan, status of the well, status of the subterranean formation, stage of drilling operations (e.g., tripping, drilling, tubular handling, etc.), and type downhole tubulars (e.g., drill pipe) utilized, among other examples.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the iron roughneck 165 is moved away or is otherwise clear of the drill string 120. When the upper end of the drill string 120 (i.e., upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The iron roughneck 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The iron roughneck 165 then releases and moves clear of the drill string 120.

The grabber of the top drive 116 may then clamp onto the drill string 120. The drive shaft 125 is brought into contact with the upper end of the drill string 120 (e.g., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., temporary storage) of tubulars 111 during various operations, such as during and between tripping out and tripping of the drill string 120. The THM 160 may comprise a plurality of actuators collectively operable to move various portions of the THM 160 to perform the methods and operations described herein. The actuators may be or comprise electric motors.

The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The well construction system 100 may further comprise a power supply system 178 configured to supply electrical and mechanical (e.g., fluid) power for actuating or otherwise powering the surface equipment 110. The power supply system 178 may include one or more electric generators, electrical energy storage devices (e.g., batteries, capacitors), and fuel storage devices, among other examples. The power supply system 178 may also include various means (not shown) for transferring and/or distributing electrical power, mechanical power, and fuel to the well construction equipment and between various pieces of equipment of the power supply system 178, including electrical power conductors, electrical connectors, electrical relays, fluid conductors, fluid connectors, and fluid valves, among other examples.

The surface equipment 110 of the well construction system 100 may also comprise a control center 190 from which various portions of the well construction system 100, such as the top drive 116, the hoisting system, the tubular handling system, the drilling fluid circulation system, the well control system, and the BHA 124, among other examples, may be monitored and controlled. The control center 190 may be located on the rig floor 114 or another location of the well construction system 100. The control center 190 may comprise a facility 191 (e.g., a room, a cabin, a trailer, etc.) containing a control workstation 197, which may be operated by rig personnel 195 (e.g., a driller or another human rig operator) to monitor and control various well construction equipment or portions of the well construction system 100. The control workstation 197 may comprise or be communicatively connected with a central controller 192 (e.g., a processing device, a computer, etc.), such as may be operable to receive, process, and output information to monitor operations of and provide control to one or more portions of the well construction system 100. For example, the central controller 192 may be communicatively connected with the various surface and downhole equipment described herein, and may be operable to receive signals from and transmit signals to such equipment to perform various operations described herein. The central controller 192 may store executable computer program code, instructions, and/or operational parameters or setpoints, including for implementing one or more aspects of methods and operations described herein. The central controller 192 may be located within and/or outside of the facility 191. Although it is possible that the entirety of the central controller 192 is implemented within one device, it is also contemplated that one or more components or functions of the central controller 192 may be implemented across multiple devices, some or an entirety of which may be implemented as part of the control center 190 and/or located within the facility 191.

The control workstation 197 may be operable for entering or otherwise communicating control data (e.g., commands, signals, information, etc.) to the central controller 192 and other equipment controller by the rig personnel 195, and for displaying or otherwise communicating information from the central controller 192 to the rig personnel 195. The control workstation 197 may comprise one or more input devices 194 (e.g., a keyboard, a mouse, a joystick, a touchscreen, etc.) and one or more output devices 196 (e.g., a video monitor, a touchscreen, a printer, audio speakers, etc.). Communication between the central controller 192, the input and output devices 194, 196, and the various well construction equipment may be via wired and/or wireless communication means. However, for clarity and ease of understanding, such communication means are not depicted, and a person having ordinary skill in the art will appreciate that such communication means are within the scope of the present disclosure.

The well construction system 100 within the scope of the present disclosure may include more or fewer components than as described above and depicted in FIG. 1. Namely, the various equipment and/or subsystems of the well construction system 100 shown in FIG. 1 may include more or fewer components than as described above and depicted in FIG. 1. For example, various local equipment controllers, sensors, fluid valves, fluid conductors, hydraulics, electrical switches, electrical conductors, actuators, engines, electric motors, and/or other equipment and components not explicitly described herein may be included in the well construction system 100, and are within the scope of the present disclosure.

The present disclosure introduces frequency-analysis-based methods for quantifying a drilling performance index (also referred to herein as a key performance indicator or KPI), such as for detecting a drilling abnormality, utilizing drilling dynamics data. The KPI is determined utilizing clear frequency and time domain information, whether online for real-time analysis or offline for post-process analysis. The KPI may be applied to quantify a drilling oscillation status (e.g., when implemented as a real-time stick-slip indicator), to evaluate controller performance (e.g., when implemented to evaluate one or more drilling rig controllers), and/or for detecting a drilling fault (e.g., when implemented to detect abnormal drilling events from differential pressure data, weight-on-bit (WOB) data, top drive speed (revolutions per minute (RPM)) and/or torque data, etc.). These applications may be in conjunction with the controllers and other equipment depicted in FIG. 1, as well as other controllers and equipment also within the scope of the present disclosure.

Related methods are disclosed in U.S. Patent Publication No. 2019/0187012 and U.S. Pat. No. 10,053,971, both of which are hereby incorporated herein by reference in their entireties. These references describe determining an oscillation performance index utilizing just time domain calculations, such that the determined indexes relate just the degree of oscillation amplitude, without frequency related information.

One or more aspects introduced in the present disclosure, however, permit quantifying oscillations at different frequencies, which in turn permits differentiating repetitive oscillations and occasional oscillations. Such aspects may also permit differentiating causes of oscillation. For example, the oscillations caused by instabilities of an automated drilling controller may have a different frequency signature from that of stick-slip oscillations.

One or more aspects of the present disclosure may be utilized to monitor performance and/or detect faults during real-time drilling. For example, a KPI determined as introduced herein may be displayed on a human-machine interface (HMI) for utilization by a human driller or another user interface (e.g., located remote from the wellsite). Such HMI may be implemented as part of the control workstation 197, among other examples. The KPI may also be utilized as feedback by a drilling supervisory system for online corrections and/or improvements. Such drilling supervisory system may be at least partially implemented by the control workstation 197, among other examples. The KPI may also be used to analyze data for post-job study and evaluation.

Figure 2:
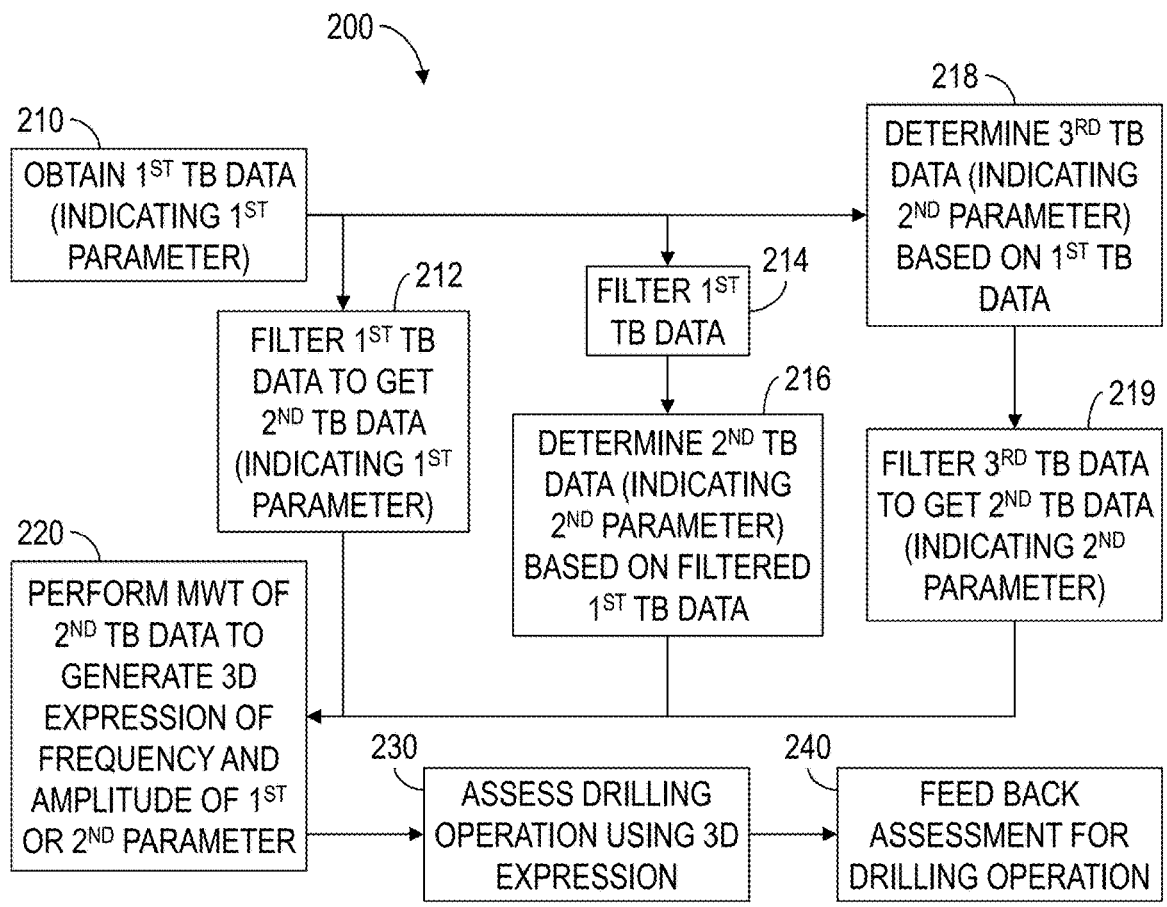
FIG. 2 is a flow-chart diagram of at least a portion of an example implementation of a method according to one or more aspects of the present disclosure.

FIG. 2 is a flow-chart diagram of at least a portion of an example implementation of a method 200 according to one or more aspects of the present disclosure. The method 200 may be utilized in conjunction with the well construction system 100 shown in FIG. 1, among other well construction systems also within the scope of the present disclosure. The method 200 may also be utilized with data obtained in association with operation of such well construction systems, whether during or after completion of the operation. Accordingly, the following description also refers to the example drilling system 100 shown in FIG. 1, although it is to be understood that the following description is also applicable or readily adaptable to other drilling systems also within the scope of the present disclosure.

The method 200 comprises obtaining 210 first time-based (TB) data indicative of a first parameter. The first parameter varies in value with respect to time and is associated with a drilling operation utilized to construct a well, such as in the example implementation depicted in FIG. 1. For example, the first parameter may be WOB, differential pressure (e.g., across the downhole mud motor 184), or torque and/or speed of the top drive 116. The first TB data may be obtained 210 by sensors 197 installed or otherwise associated with the drawworks 118, drill line 123, and/or other components affecting or otherwise associated with WOB; by sensors 198 installed or otherwise associated with the mud motor 184, mud pumps 144, and/or other components affecting or otherwise associated with differential pressure; and/or by sensors 199 installed or otherwise associated with the top drive 116, a torque sub (not shown), a variable-frequency drive (VFD, not shown), and/or other components affecting or otherwise associated with torque and/or speed of the top drive 116.

Second TB data indicative of a second parameter may be determined utilizing the first TB data. For example, in the context of the top drive torque and/or speed data example, the second parameter may be load torque determined by the measured top drive torque and speed and estimated top drive inertia. The equation set forth below provides an example of determining the load torque.

load torque=top drive torque−(Δ top drive RPM/Δt)
*top drive inertia where Δ top drive RPM is the change in top drive speed during time period Δt.

Some aspects described below are presented in the context of determining the drilling oscillation KPI using top drive torque data. However, such aspects are also applicable or readily adaptable for use with WOB or differential pressure data, such as to evaluate performance of a controller of the drilling system (e.g., an automated drilling controller), to detect a drilling abnormality (e.g., an anomaly of the formation 106), or to monitor the occurrence of the drill bit 126 bouncing on the bottom of the wellbore 102, among other uses also within the scope of the present disclosure.

The method 200 also comprises performing 220 a moving window transform (MWT) of second TB data to generate a three-dimensional (3D) expression of frequency and amplitude of the first parameter or the second parameter. The second TB data may be dependent upon or otherwise based on the first TB data, such that the second parameter also varies in value with respect to time. For example, the second TB data may be a subset of the first TB data, such as in implementations in which the second TB data is a truncation or other modification of the first TB data. One such example depicted in FIG. 2 is that the second TB data is the result of filtering 212 the first TB data, in which case the 3D expression is of the first parameter. Another example is that the first TB data may be filtered 214 and then utilized to determine 216 the second TB data, in which case the 3D expression is of the second parameter. In another example, third TB data may be determined 218 based on the first TB data and then filtered 219 to result in the second TB data, in which case the 3D expression is of the second parameter.

The filtering 212, 214, and/or 219 may be performed to remove unrelated data from the first or second TB data. For example, in the example utilizing top drive torque and/or speed data to determine load torque, the determined 218 may be filtered 219 utilizing a predetermined filter configured to retain just the information of a frequency band being investigated. The frequency band may vary depending on the application. For example, if stick-slip is the main focus of investigation, the filtering 219 may retain just the data in a frequency band of about 0.05-2.0 Hertz (Hz), whereas if whirling or bit bouncing is the main focus of investigation, the filtering 219 may retain higher frequencies. An upper limit of the frequency band may be clamped to avoid alias in the subsequent frequency analysis. If the interested frequency band is from direct current (DC) to 2 Hz, a low-pass filter may be utilized. In another example, one or more of the filters 212, 214, 219 may be a band-pass filter from 0.05-10 Hz.

Figure 4:
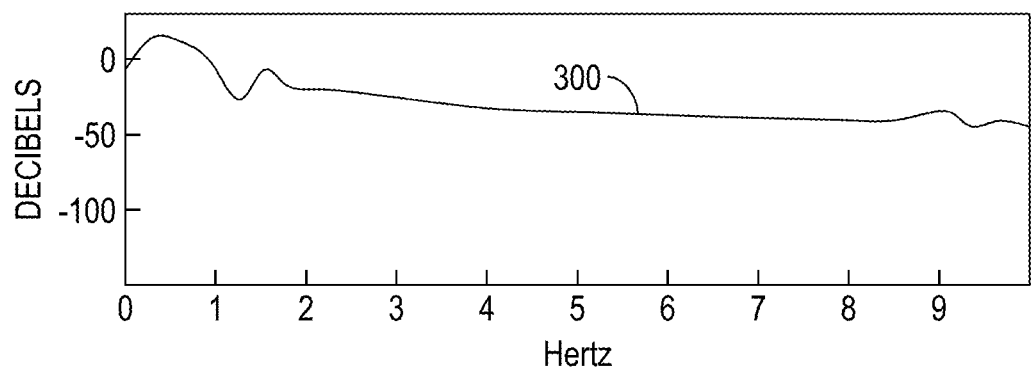
FIGS. 4-7 are graphs each depicting one or more aspects introduced in the present disclosure.
Figure 5:
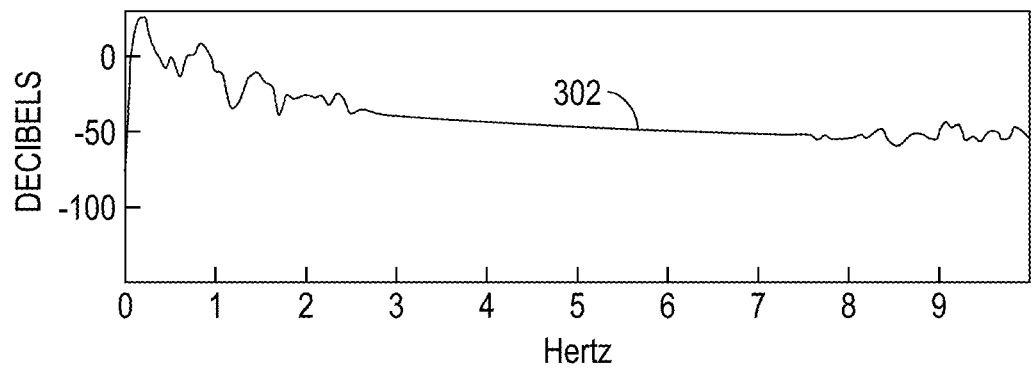

The MWT 220 may be a Fast Fourier Transform (FFT) and/or other known or future-developed methods for converting the second time-based data into the frequency domain. The FFT MWT applies an FFT on a window of the second TB data spanning a predetermined period of time. For example, the window may move along the time axis of the second TB data and calculate the FFT in consecutive time instances, resulting in a time series of spectrum plots. FIG. 4 is a graph depicting an example FFT spectrum plot 300 with a window size of 64 measurements, and FIG. 5 is a graph depicting an example FFT spectrum plot 302 with a window size of 256 measurements. For drilling oscillation data analysis according to one or more aspects of the present disclosure, the window size of the moving FFT may be predetermined based on depth of the wellbore 102 and properties of the drill string 120, including the BHA 180 and drill bit 126, as well as a frequency band to be investigated. The window size may be a trade-off between being short enough to reasonably detect instantaneous oscillations and being long enough to have reasonably high resolution in frequency. The sizes of windows and corresponding FFT implementations may be predetermined and stored in a filter bank for adaptively selecting online based on different drilling situations and investigations.

The MWT 220 may instead be a wavelet transform and/or other known or future-developed methods for converting the second TB data into the frequency-time domain. Wavelet based spectrum analysis may decompose the second TB data into a bank of orthogonal wavelet bases. The resulted projection coefficients indicate the strength of each basis contained in the second TB data. The wavelet bases are functions of time and are derived by dilating or translating a pre-selected mother wavelet (e.g., a Morlet wavelet). The wavelet bases contain both time and frequency information, such that the wavelet transform also contains time and frequency information. The wavelet transform can be applied using a moving window for real-time oscillation data analysis, or it can be applied for a section of drilling oscillation data for post-process data analysis.

Figure 6:
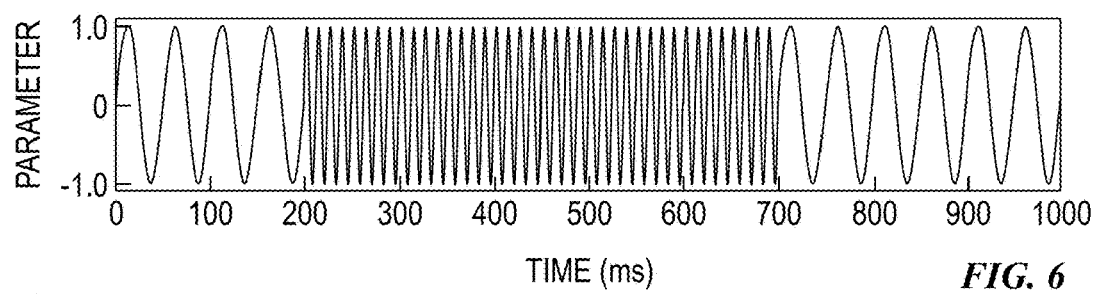
Figure 7:
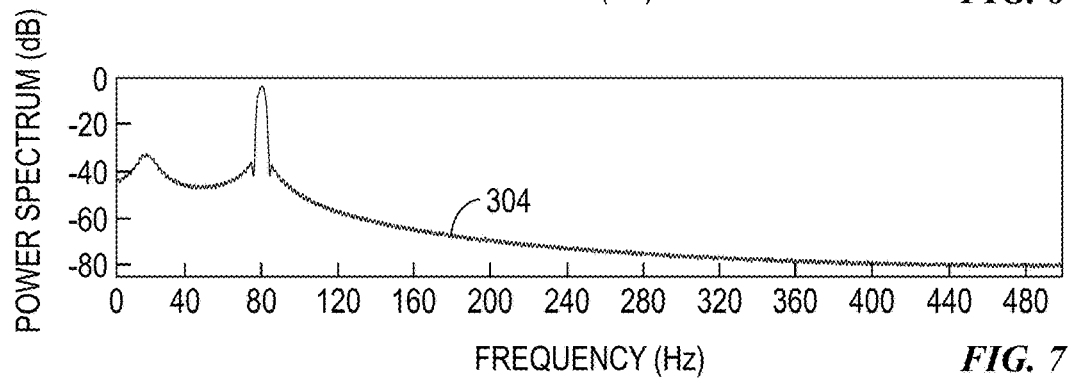
Figure 8:
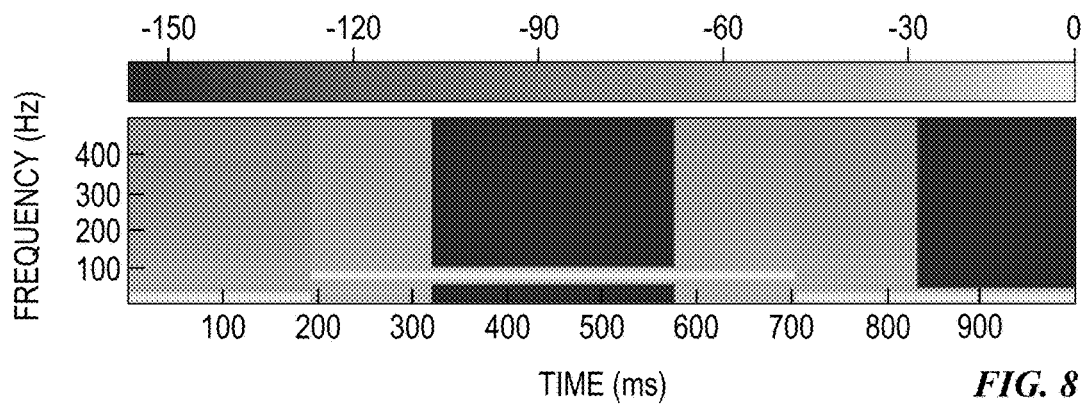
FIGS. 8 and 9 are spectrum plots each depicting one or more aspects introduced in the present disclosure.
Figure 9:
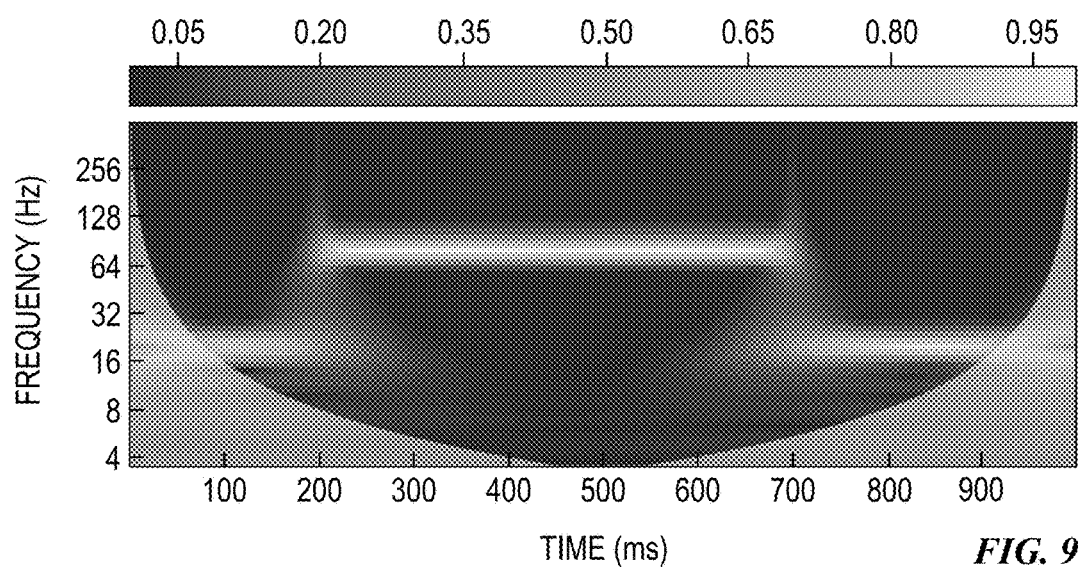

FIGS. 6-9 illustrate potential benefits of window size selection for the MWT 220. FIG. 6 depicts one second of example TB data sampled at 1000 Hz and containing 20 Hz signals (up to 200 milliseconds (ms) and after 700 ms) and an 80 Hz signal (between 200 ms and 700 ms). FIG. 7 depicts an example result 304 of an MWT 220 using FFT with a window length of 1000 data points. FIG. 7 depicts just the frequency components of the time series, without showing the occurrence time of the frequencies (i.e., the 20 Hz signal is only at the beginning and the end of the data). When a proper window size (e.g., 256 data points) is selected, the additional time domain information is shown in the FFT MWT 220 result depicted in FIG. 8. In comparison, with a wavelet transform being applied to all 1000 data depicted in FIG. 6, the frequency occurrence over time is well identified, as depicted in FIG. 9. Thus, a wavelet transform is not sensitive to window size when implemented in drilling oscillation data when the length of data covers the period of the lowest frequency of investigation.

Returning to FIG. 2, the method 200 also comprises assessing 230 the drilling operation based on the expression generated by performing 220 the MWT of the second TB data. Assessing 230 the drilling operation may comprise comparing the expression to each of a plurality of predetermined models. For example, the expression may be compared to predetermined patterns, such as by assessing alignment between the expression and the predetermined patterns.

Figure 3:
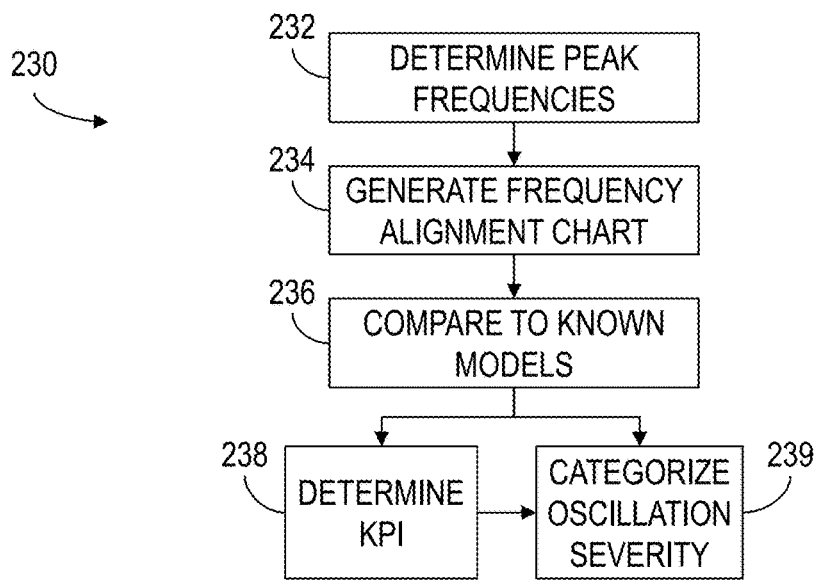
FIG. 3 is a flow-chart diagram of at least a portion of an example implementation of a portion of the method shown in FIG. 2.

However, the drilling operation assessment 230 may take other forms, perhaps including one or more of the example aspects depicted in FIG. 3. For example, a peak frequency may be determined 232 at each timestep in the expression generated by performing 220 the MWT of the second TB data. The peak frequencies may be determined 232 via an automated peak picking algorithm that selects each timestep frequency having an amplitude greater than a predetermined threshold. A frequency alignment chart may then be generated 234 by mapping the peak frequencies and their corresponding amplitudes onto a predetermined frequency template. The frequency template may be based on known oscillation events that occurred during previous drilling operations. The frequency template may be defined based on the interested oscillation events being investigated. For example, if the investigation is focused on stick-slip, the frequency template may contain the drill string torsional resonance frequencies, first and higher orders. If the investigation is interested in other oscillations, like the oscillations generated from poor performance of an automated drilling controller or another controller, the frequency template can be defined accordingly.

The frequency alignment chart may then be compared 236 to each of a plurality of predetermined models. The drilling operation assessment 230 may also comprise determining 238 a KPI by quantifying differences between (a) the determined 232 peak frequencies and the predetermined frequencies of the frequency template and/or (b) the amplitudes of the determined 232 peak frequencies and the corresponding amplitudes of the frequency template.

The predetermined frequencies of the frequency template may also be assigned weights corresponding to likelihoods of indicating unsafe, damaging, or inefficient drilling events or situations. In such implementations, the performance indicator may be determined 238 by summing products of each quantified difference (between the determined 232 and predetermined frequencies and/or amplitudes) and the corresponding weight for each predetermined frequency of the frequency template. Assessing 232 the drilling operation may further comprise utilizing the determined performance indicator to categorize 239 severity of oscillation of the drilling operation into one of a plurality of predetermined categories that are based on predetermined thresholds. The predetermined thresholds may be based on field tests, among other ways.

Each model utilized for the comparison 236 may correspond to different drilling sections of the well. For example, the drilling operation may comprise a plurality of different drilling sections and events each having a different expected value of the determined 238 performance indicator. The drilling operation assessment 230 may comprise determining 238 the performance indicator for each of the different drilling sections and events, and then comparing the performance indicator determined for each of the different drilling sections and events with the expected value corresponding to that drilling section or event.

The generated 234 frequency alignment chart may also (or instead) be fed into a classification algorithm (e.g., a neutral network, etc.). For example, the classification algorithm may compare the generated 234 frequency alignment chart, or features thereof, with predetermined (e.g., typical or commonly occurring) frequency signatures during or after the drilling operation, or at various drilling sections/events. Accordingly, different oscillation types, as well as unexpected oscillations, may be identified.

Figure 10:
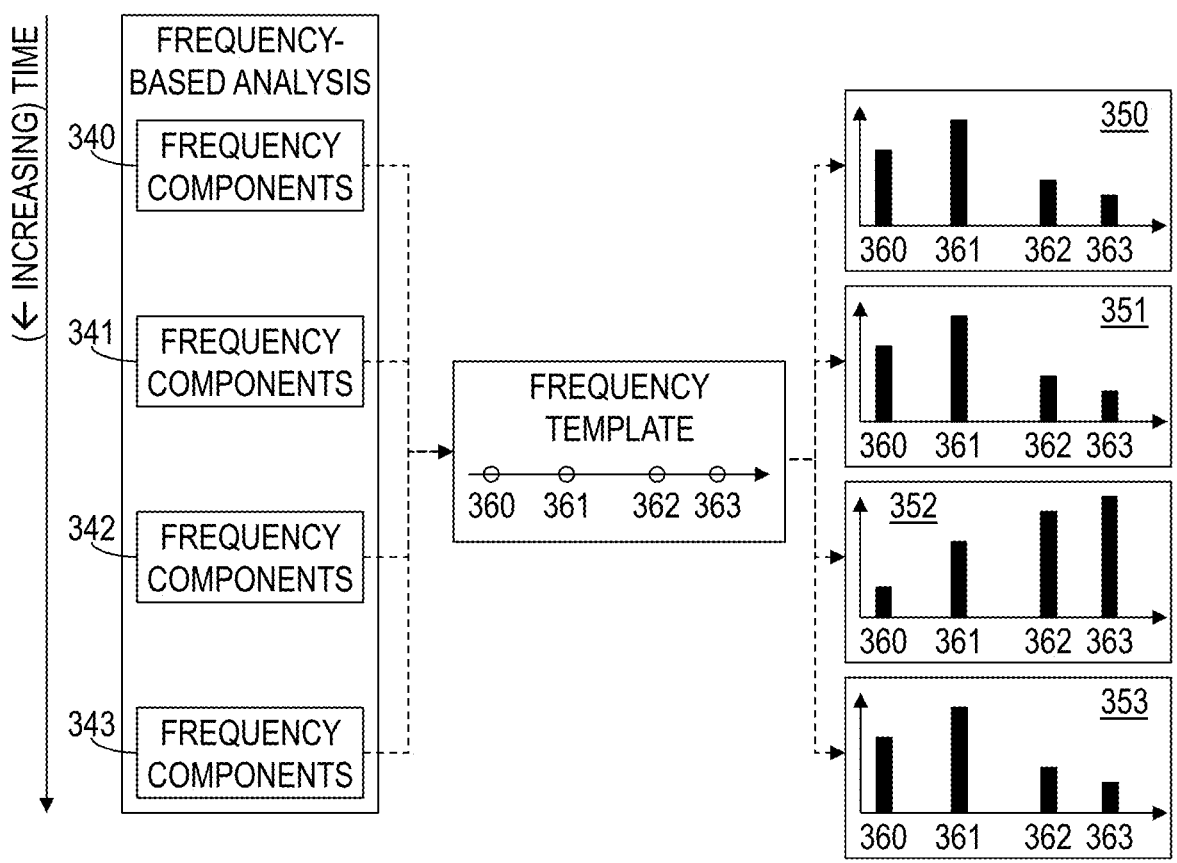
FIG. 10 is a schematic view depicting frequency alignment according to one or more aspects of the present disclosure.

An example of this is depicted in FIG. 10. The frequency analysis is performed as described above, resulting in frequency components being generated at each of times 340-343. The frequency components are utilized to generate frequency alignment charts 350-353 at each of the times 340-343, using a predetermined frequency template 360 having predetermined frequencies 360-363. The frequency alignment chart 352 is different than expected (e.g., as identified by comparison to temporally adjacent charts 351 and 353), indicating unexpected oscillations.

Returning to FIG. 2, the drilling operation assessment 230 may be illustrated by the following example. The drilling operation may be a first drilling operation performed utilizing a first drilling system. The frequency template may be based on a known stick-slip oscillation event that occurred during a second drilling operation, wherein the second drilling operation was performed utilizing a second drilling system prior to commencement of the first drilling operation. The frequency template may contain resonance frequencies of the second drilling system. Generating the frequency alignment chart may comprise mapping the peak frequencies and their corresponding amplitudes to the resonance frequencies of the second drilling system.

The method 200 may further comprise utilizing 240 the comparison (or other form of the assessment 230) as feedback. The feedback may be utilized 240 during the drilling operation, such as during each corresponding drilling section performance or event occurrence. For example, the feedback may be utilized 240 as a base for manual and/or automatic actions in order to improve drilling quality or mitigate anomalies.

Figure 11:
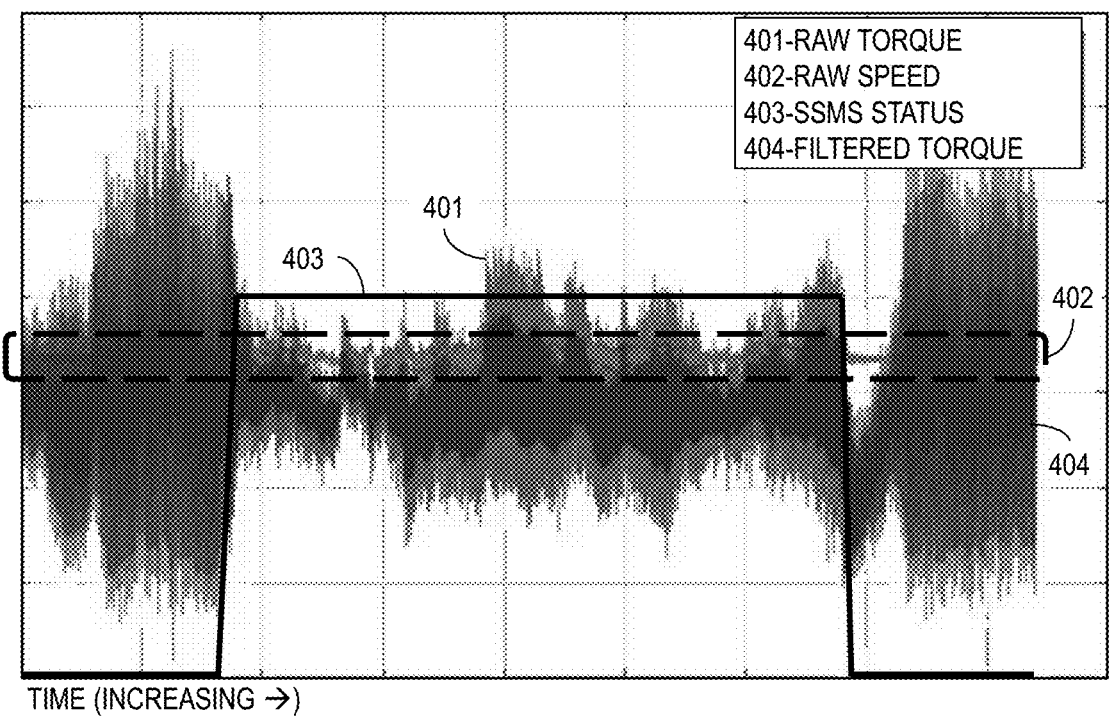
FIG. 11 is a plot of example data utilized herein to illustrate performing a method according to one or more aspects of the present disclosure.
Figure 12:
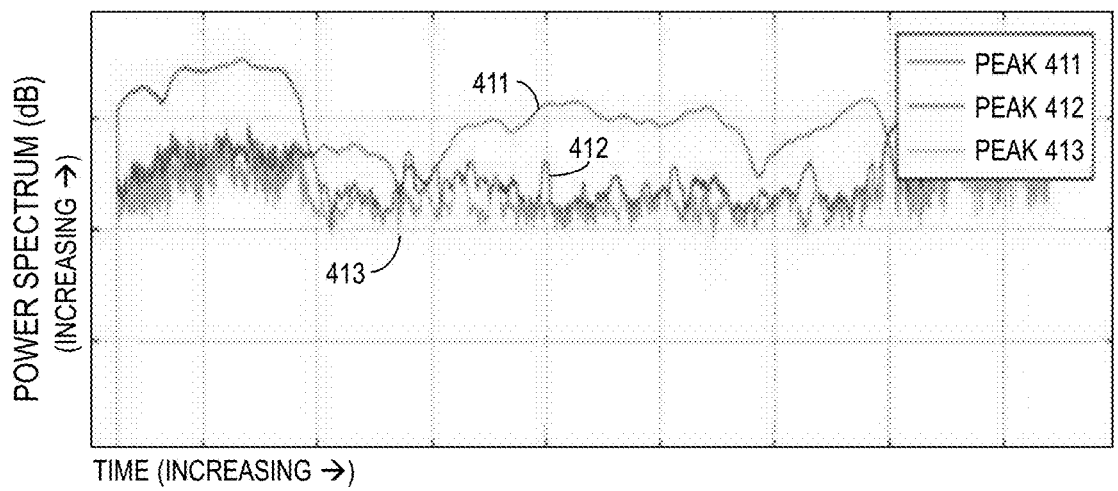
FIG. 12 is a plot of peak amplitudes generated according to one or more aspects of the present disclosure.
Figure 13:
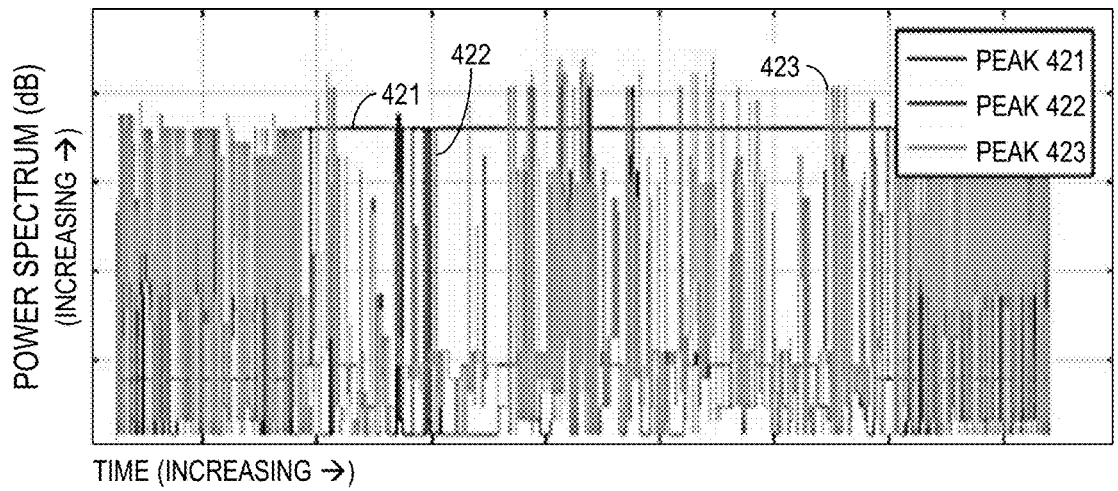
FIG. 13 is a plot of peak frequencies generated according to one or more aspects of the present disclosure.
Figure 14:
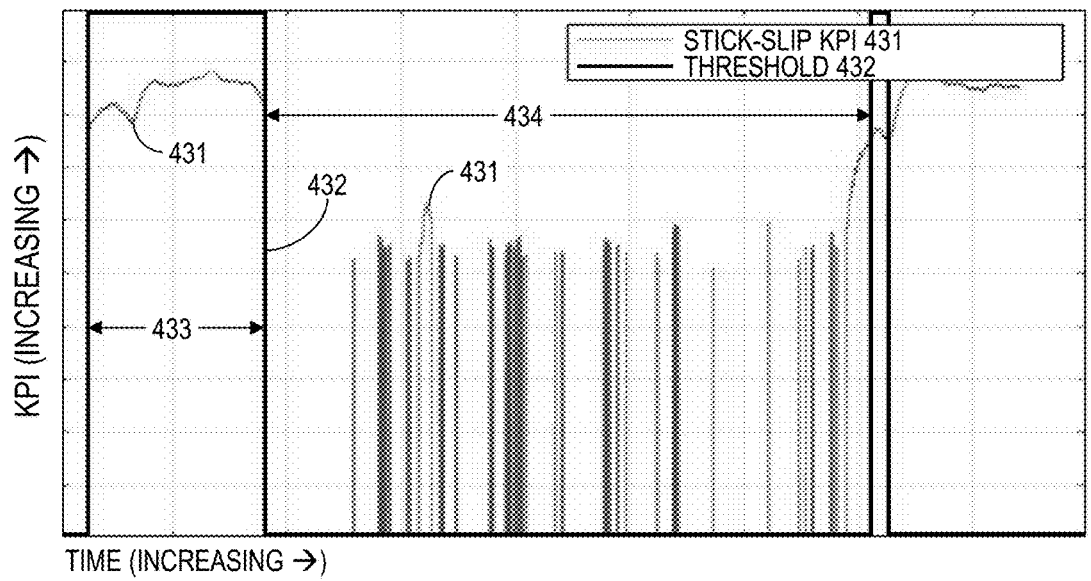
FIG. 14 is a plot of a drilling oscillation indicator corresponding to FIGS. 11-13.

The following description pertains to an example utilizing one or more aspects described above to determine the drilling oscillation KPI in conjunction with example field test data obtained by a stick-slip mitigation system. FIG. 11 depicts the example field test data, including raw top drive torque 401 (the lighter data), raw top drive speed 402, status 403 of the stick-slip mitigation system, and filtered drill string torque 404 (the darker data). The drill string torque 404 was determined utilizing the raw top drive torque 401 and speed 402 and then passed through a predetermined bandpass filter of 0.05-2.0 Hz. A window of length 256 was moved along the time axis of the filtered drill string torque data 404 to determine a series of frequency components of the field data, as depicted in the peak amplitudes 411-413 of FIG. 12 and the corresponding peak frequencies 421-423 of FIG. 13. The frequency template was defined to contain just the first order resonance frequency (0.39 Hz in the example data), and thus the frequency's weight is 1. The KPI was determined as the weight*alignment. As depicted in FIG. 14, when the KPI 431 is higher than a predetermined threshold 432, it indicates high oscillation, and when the KPI 431 is lower than the predetermined threshold 432, it indicates low oscillation. In the depicted example results, the predetermined threshold 432 is 0.75, and the KPI is determined from the power spectrum amplitude (decibels, dB) divided by 200 dB, although other methods can be used within the scope of the present disclosure. The KPI 431 is consistent with the stick-slip mitigation system status (on or off). That is, during an initial period 433, the stick-slip mitigation system is off and the stick-slip oscillation index 431 is high, whereas during a subsequent period 434 when the stick-slip mitigation system is on, the oscillation index 431 is low.

Figure 15:
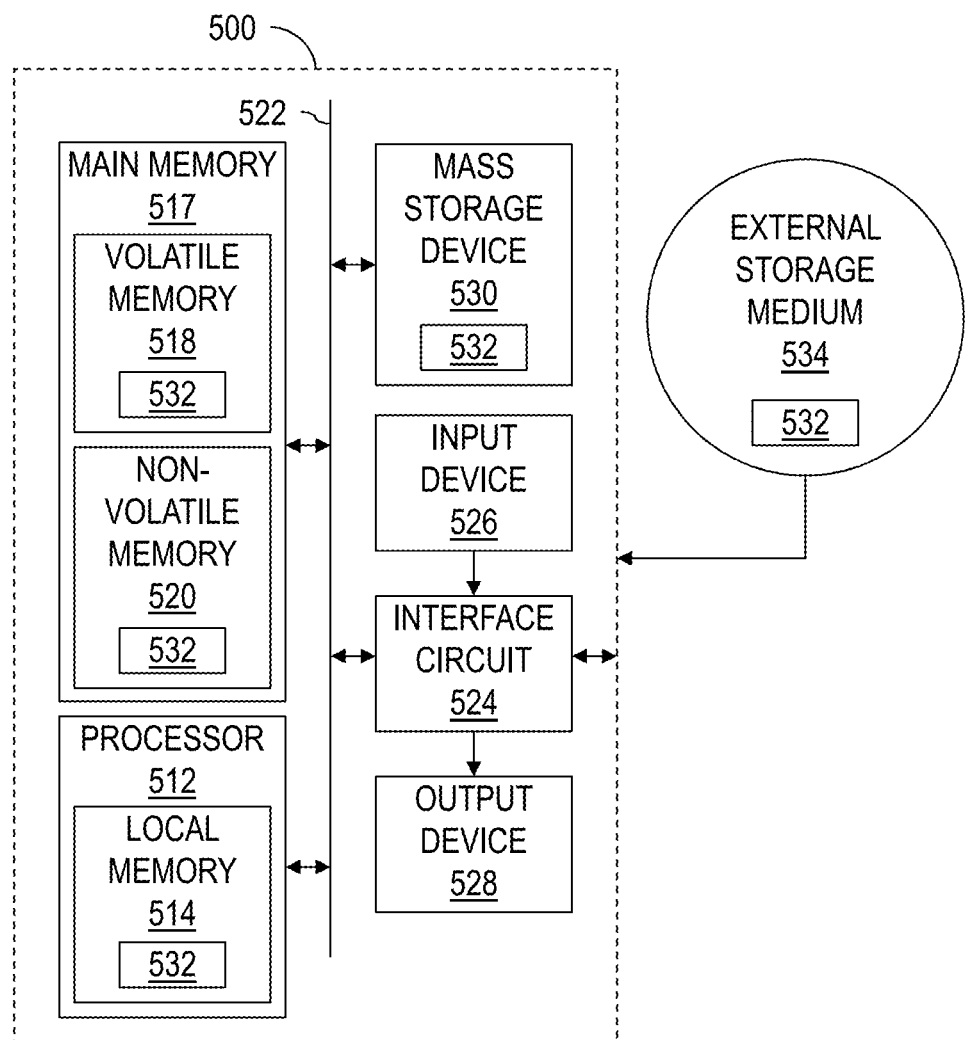
FIG. 15 is a schematic view of at least a portion of an example implementation of a processing system according to one or more aspects of the present disclosure.

FIG. 15 is a schematic view of at least a portion of an example implementation of a processing device 500 (or system) according to one or more aspects of the present disclosure. The processing device 500 may be or form at least a portion of one or more equipment controllers and/or other electronic devices shown in FIG. 1.

The processing device 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 500 may be or form at least a portion of one or more controllers and/or control system of a rig, such as the well construction system 100 shown in FIG. 1. For example, the processing device 500 may be or form at least a portion of the control workstation 197. Although it is possible that the entirety of the processing device 500 is implemented within one device, it is also contemplated that one or more components or functions of the processing device 500 may be implemented across multiple devices, some or an entirety of which may be at the wellsite and/or remote from the wellsite.

The processing device 500 may comprise a processor 512, such as a general-purpose programmable processor. The processor 512 may comprise a local memory 514 and may execute machine-readable and executable program code instructions 532 (i.e., computer program code) present in the local memory 514 and/or another memory device. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and/or processors based on a multi-core processor architecture, as non-limiting examples. Examples of the processor 512 include one or more INTEL microprocessors, microcontrollers from the ARM and/or PICO families of microcontrollers, and/or embedded soft/hard processors in one or more FPGAs.

The processor 512 may execute, among other things, the program code instructions 532 and/or other instructions and/or programs to implement the example methods and/or operations described herein. For example, the program code instructions 532, when executed by the processor 512 of the processing device 500, may cause the processor 512 to receive and process (e.g., compare) sensor data (e.g., sensor measurements). The program code instructions 532, when executed by the processor 512 of the processing device 500, may also or instead cause the processor 512 to output control data (i.e., control commands) to cause one or more portions or pieces of well construction equipment of a well construction system to perform the example methods and/or operations described herein.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing device 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third-generation input/output (3 GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 500 may be in communication with various sensors, video cameras, actuators, processing devices, equipment controllers, and other devices of the well construction system via the interface circuit 524. The interface circuit 524 can facilitate communications between the processing device 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit a human user to enter the program code instructions 532, which may be or comprise control data, operational parameters, operational setpoints, a well construction plan, and/or a database of operational sequences. The program code instructions 532 may further comprise modeling or predictive routines, equations, algorithms, processes, applications, and/or other programs operable to perform example methods and/or operations described herein. The input devices 426 may be, comprise, or be implemented by a keyboard, a mouse, a joystick, a touchscreen, a trackpad, a trackball, and/or a voice recognition system, among other examples. One or more output devices 528 may also be connected to the interface circuit 524. The output devices 528 may permit visualization or other sensory perception of various data, such as sensor data, status data, and/or other example data. The output devices 528 may be, comprise, or be implemented by video output devices (e.g., a liquid crystal display (LCD), a light-emitting diode (LED) display, a cathode ray tube (CRT) display, a touchscreen, etc.), printers, and/or speakers, among other examples. The one or more input devices 526 and the one or more output devices 528 connected to the interface circuit 524 may, at least in part, facilitate the communication devices described herein.

The processing device 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a flash drive, a compact disk (CD) drive, and/or digital versatile disk (DVD) drive, among other examples. The processing device 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 may be stored in the mass storage device 530, the main memory 516, the local memory 514, and/or the removable storage medium 534. Thus, the processing device 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 532 may include program instructions or computer program code that, when executed by the processor 512, may perform and/or cause performance of example methods, processes, and/or operations described herein.

The present disclosure is further directed to example methods (e.g., operations and/or processes) of performing, monitoring, and/or assessing wellsite operations described herein, such as the methods and aspects thereof depicted in FIGS. 2-14. The methods may be performed by utilizing or otherwise in conjunction with at least a portion of one or more implementations of one or more instances of the apparatus shown in one or both of FIGS. 1 and 15, and/or otherwise within the scope of the present disclosure. The methods may be caused to be performed, at least partially, by a processing device, such as the processing device 500 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be caused to be performed, at least partially, by a human wellsite operator utilizing one or more instances of the apparatus shown in one or both of FIGS. 1 and 15, and/or otherwise within the scope of the present disclosure.

In view of the entirety of the present disclosure, including the figures and the claims, a person having ordinary skill in the art will readily recognize that the present disclosure introduces a method comprising obtaining first time-based data indicative of a first parameter, wherein the first parameter varies in value with respect to time and is associated with a drilling operation utilized to construct a well extending into a subterranean formation. The method also comprises performing a moving window transform of second time-based data to generate a three-dimensional expression of frequency and amplitude of the first parameter or a second parameter, wherein the second time-based data is based on the first time-based data, and wherein the second parameter varies in value with respect to time and is dependent upon the first parameter. The method also comprises assessing the drilling operation based on the expression.

The moving window transform may be a Fast Fourier Transform or a wavelet transform.

The second time-based data may be a subset of the first time-based data. For example, the method may comprise filtering the first time-based data to obtain the second time-based data.

The method may comprise filtering the first time-based data and determining the second parameter based on the filtered first time-based data, wherein the expression is of the frequency and amplitude of the second parameter.

The second time-based data may be indicative of the second parameter and the method may comprise determining the second time-based data utilizing the first time-based data. In such implementations, among others within the scope of the present disclosure, the expression may be of the frequency and amplitude of the second parameter.

The second time-based data may be indicative of the second parameter and the method may comprise determining the second time-based data by: determining third time-based data utilizing the first time-based data; and filtering the third time-based data to obtain the second time-based data. In such implementations, among others within the scope of the present disclosure, the expression may be of the frequency and amplitude of the second parameter.

Performing the moving window transform may generate the expression in real-time while the drilling operation is being performed.

The moving window transform may be performed after the drilling operation is complete.

Assessing the drilling operation may comprise comparing the expression to each of a plurality of predetermined models.

Assessing the drilling operation may comprise determining one or more peak frequencies at each timestep in the expression, generating a frequency alignment chart by mapping the peak frequencies and their corresponding amplitudes onto a predetermined frequency template, and comparing the frequency alignment chart to each of a plurality of predetermined models.

Assessing the drilling operation may comprise determining one or more peak frequencies at each timestep in the expression, generating a frequency alignment chart by mapping the peak frequencies and their corresponding amplitudes onto a predetermined frequency template, and determining a performance indicator by quantifying differences between: the determined peak frequencies and the predetermined frequencies of the frequency template; and the amplitudes of the determined peak frequencies and the corresponding amplitudes of the frequency template. In such implementations, among others within the scope of the present disclosure, the peak frequencies may be determined via an automated peak picking algorithm that selects, at each timestep, one or more frequencies having an amplitude greater than a predetermined threshold. The frequency template may be based on known oscillation events that occurred during previous drilling operations. The drilling operation may be a first drilling operation performed utilizing a first drilling system, the frequency template may be based on a known stick-slip oscillation event that occurred during a second drilling operation, the second drilling operation may have been performed utilizing a second drilling system prior to commencement of the first drilling operation, the frequency template may contain resonance frequencies of the second drilling system, and generating the frequency alignment chart may comprise mapping the peak frequencies and their corresponding amplitudes to the resonance frequencies of the second drilling system.

The predetermined frequencies of the frequency template may be assigned weights corresponding to likelihoods of indicating unsafe, damaging, or inefficient drilling events or situations, and the performance indicator may be determined by summing products of each quantified difference and corresponding weight for each predetermined frequency of the frequency template. In such implementations, among others within the scope of the present disclosure, assessing the drilling operation may further comprise utilizing the determined performance indicator to categorize severity of oscillation of the drilling operation into one of a plurality of predetermined categories that are based on predetermined thresholds.

The drilling operation may comprise a plurality of different drilling sections and events each having a different expected value of the performance indicator. In such implementations, among others within the scope of the present disclosure, assessing the drilling operation may comprise determining the performance indicator for each of the different drilling sections and events and comparing the performance indicator determined for each of the different drilling sections and events with the expected value corresponding to that drilling section or event. The method may further comprise utilizing the comparison as feedback, during the corresponding drilling section performance or event occurrence, as a base for manual and/or automatic actions to improve drilling quality or mitigate anomalies.

The present disclosure also introduces a method comprising commencing operation of a controller of a well construction system, wherein the well construction system is located at a wellsite and comprises a plurality of pieces of equipment operable to perform well construction operations, and wherein commencing operation of the controller causes the controller to: (A) receive sensor data facilitated by a plurality of sensors each disposed in association with a corresponding piece of equipment; (B) obtain first time-based data indicative of a first parameter, wherein the first parameter varies in value with respect to time and is associated with a drilling operation utilized to construct a well extending into a subterranean formation; (C) perform a moving window transform of second time-based data to generate a three-dimensional expression of frequency and amplitude of the first parameter or a second parameter, wherein the second time-based data is based on the first time-based data, and wherein the second parameter varies in value with respect to time and is dependent upon the first parameter; and (D) assess the drilling operation based on the expression. Other aspects of the controller operation are as described above.

The present disclosure also introduces a controller of a well construction system, wherein the well construction system is located at a wellsite and comprises a plurality of pieces of equipment operable to perform well construction operations, and wherein the controller is operable to: (A) receive sensor data facilitated by a plurality of sensors each disposed in association with a corresponding piece of equipment; (B) obtain first time-based data indicative of a first parameter, wherein the first parameter varies in value with respect to time and is associated with a drilling operation utilized to construct a well extending into a subterranean formation; (C) perform a moving window transform of second time-based data to generate a three-dimensional expression of frequency and amplitude of the first parameter or a second parameter, wherein the second time-based data is based on the first time-based data, and wherein the second parameter varies in value with respect to time and is dependent upon the first parameter; and (D) assess the drilling operation based on the expression. Other aspects of the controller operation are as described above.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method comprising:
obtaining first time-based data indicative of a first parameter, wherein the first parameter:
    varies in value with respect to time; and
    is associated with a drilling operation utilized to construct a well extending into a subterranean formation;
performing a moving window transform of second time-based data to generate a three-dimensional expression of frequency and amplitude of the first parameter or a second parameter, wherein:
    the second time-based data is based on the first time-based data; and
    the second parameter:
        varies in value with respect to time; and is dependent upon the first parameter; and assessing the drilling operation based on the expression.

2. The method of claim 1 wherein the moving window transform is a Fast Fourier Transform.

3. The method of claim 1 wherein the moving window transform is a wavelet transform.

4. The method of claim 1 wherein the second time-based data is a subset of the first time-based data.

5. The method of claim 4 further comprising filtering the first time-based data to obtain the second time-based data.

6. The method of claim 1 further comprising:

filtering the first time-based data; and determining the second parameter based on the filtered first time-based data, wherein the expression is of the frequency and amplitude of the second parameter.

7. The method of claim 1 wherein:

the second time-based data is indicative of the second parameter;

the method further comprises determining the second time-based data utilizing the first time-based data; and the expression is of the frequency and amplitude of the second parameter.

8. The method of claim 1 wherein:

the second time-based data is indicative of the second parameter;

the method further comprises determining the second time-based data by:

determining third time-based data utilizing the first time-based data; and filtering the third time-based data to obtain the second time-based data; and the expression is of the frequency and amplitude of the second parameter.

9. The method of claim 1 wherein performing the moving window transform generates the expression in real-time while the drilling operation is being performed.

10. The method of claim 1 wherein the moving window transform is performed after the drilling operation is complete.

11. The method of claim 1 wherein assessing the drilling operation comprises comparing the expression to each of a plurality of predetermined models.

12. The method of claim 1 wherein assessing the drilling operation comprises:

determining one or more peak frequencies at each timestep in the expression;

generating a frequency alignment chart by mapping the peak frequencies and their corresponding amplitudes onto a predetermined frequency template; and comparing the frequency alignment chart to each of a plurality of predetermined models.

13. The method of claim 1 wherein assessing the drilling operation comprises:

determining one or more peak frequencies at each timestep in the expression;

generating a frequency alignment chart by mapping the peak frequencies and their corresponding amplitudes onto a predetermined frequency template; and determining a performance indicator by quantifying differences between:

the determined peak frequencies and the predetermined frequencies of the frequency template; and the amplitudes of the determined peak frequencies and the corresponding amplitudes of the frequency template.

14. The method of claim 13 wherein the peak frequencies are determined via an automated peak picking algorithm that selects, at each timestep, one or more frequencies having an amplitude greater than a predetermined threshold.

15. The method of claim 13 wherein the frequency template is based on known oscillation events that occurred during previous drilling operations.

16. The method of claim 13 wherein:

the drilling operation is a first drilling operation performed utilizing a first drilling system;

the frequency template is based on a known stick-slip oscillation event that occurred during a second drilling operation;

the second drilling operation was performed utilizing a second drilling system prior to commencement of the first drilling operation;

the frequency template contains resonance frequencies of the second drilling system; and generating the frequency alignment chart comprises mapping the peak frequencies and their corresponding amplitudes to the resonance frequencies of the second drilling system.

17. The method of claim 13 wherein:

the predetermined frequencies of the frequency template are assigned weights corresponding to likelihoods of indicating unsafe, damaging, or inefficient drilling events or situations; and the performance indicator is determined by summing products of each quantified difference and corresponding weight for each predetermined frequency of the frequency template.

18. The method of claim 17 wherein assessing the drilling operation further comprises utilizing the determined performance indicator to categorize severity of oscillation of the drilling operation into one of a plurality of predetermined categories that are based on predetermined thresholds.

19. The method of claim 13 wherein:

the drilling operation comprises a plurality of different drilling sections and events each having a different expected value of the performance indicator; and assessing the drilling operation comprises:

determining the performance indicator for each of the different drilling sections and events; and comparing the performance indicator determined for each of the different drilling sections and events with the expected value corresponding to that drilling section or event.

20. The method of claim 19 further comprising utilizing the comparison as feedback, during the corresponding drilling section performance or event occurrence, as a base for manual and/or automatic actions to improve drilling quality or mitigate anomalies.

* * * * *